United States Patent [19]

Okubo et al.

[11] Patent Number: 4,550,488
[45] Date of Patent: Nov. 5, 1985

[54] GANG HEAD TYPE MACHINE TOOL

[75] Inventors: Takeshi Okubo, Sayama; Hideo Kodachi, Kodaira; Masaki Miyanaka, Kawagoe, all of Japan

[73] Assignee: Honda Giken Kogyo Kabushiki Kaisha, Tokyo, Japan

[21] Appl. No.: 449,236

[22] Filed: Dec. 13, 1982

[30] Foreign Application Priority Data

Dec. 12, 1981 [JP] Japan .................. 56-199484
Feb. 15, 1982 [JP] Japan .................. 57-21079

[51] Int. Cl.$^4$ ............................................. B23Q 3/157
[52] U.S. Cl. ........................... 29/568; 29/26 A; 408/35; 408/42
[58] Field of Search .............. 29/568, 26 A; 409/135, 409/185, 191, 192, 204, 230; 408/42, 35, 36, 37, 38, 39, 40, 41, 43, 53, 129, 130

[56] References Cited

U.S. PATENT DOCUMENTS

| | | | |
|---|---|---|---|
| 2,049,444 | 8/1936 | Hirvonen | 408/130 X |
| 2,070,811 | 2/1937 | Sassen | 409/135 |
| 3,354,761 | 11/1967 | Sadier | 29/568 X |
| 3,555,962 | 1/1971 | Wolf et al. | 409/135 X |
| 3,733,142 | 5/1973 | Hoglund | 408/53 X |
| 3,760,472 | 9/1973 | Kielma et al. | 29/568 X |
| 3,806,691 | 4/1974 | Roach | 409/185 X |
| 3,851,380 | 12/1974 | Kurimoto et al. | 29/568 |
| 3,881,836 | 5/1975 | Hoglund | 408/42 |
| 4,012,818 | 3/1977 | Dornbluth et al. | 29/568 X |
| 4,038,739 | 8/1977 | Nohejl | 29/568 |
| 4,110,898 | 9/1978 | Yamaoka et al. | 29/568 |
| 4,215,958 | 8/1980 | Jagers | 408/42 X |
| 4,216,572 | 8/1980 | Matsushita et al. | 29/568 |
| 4,404,792 | 9/1983 | Jensen et al. | 29/568 |

FOREIGN PATENT DOCUMENTS 55-17800 2/1980 Japan .................. 29/26 A

*Primary Examiner*—William R. Briggs
*Assistant Examiner*—Glenn L. Webb
*Attorney, Agent, or Firm*—Armstrong, Nikaido, Marmelstein & Kubovcik

[57] ABSTRACT

The present invention is directed to a gang head for a replaceable gang head type machine tool. The machine tool includes a base, a jig table, a driving member mounted on the base and movable to an advance and retract with respect to the jig table, and an annular rail surrounding the driving member. The annular rail has a rear stationary rail and a movable front rail, the movable rail movable to advance and retract with respect to the jig table along the same direction as the driving member. The gang head comprises a base frame mounted on the movable rail, a working unit mounted on the base frame, wherein the working unit is inclined at an angle other than a right angle, with respect to the direction of advance and retraction of the movable rail, an oil pressure pump, and an oil pressure operated cylinder. The oil pressure cylinder being operatively coupled to the working unit for advancing and retracting the working unit with respect to the jig table.

5 Claims, 8 Drawing Figures

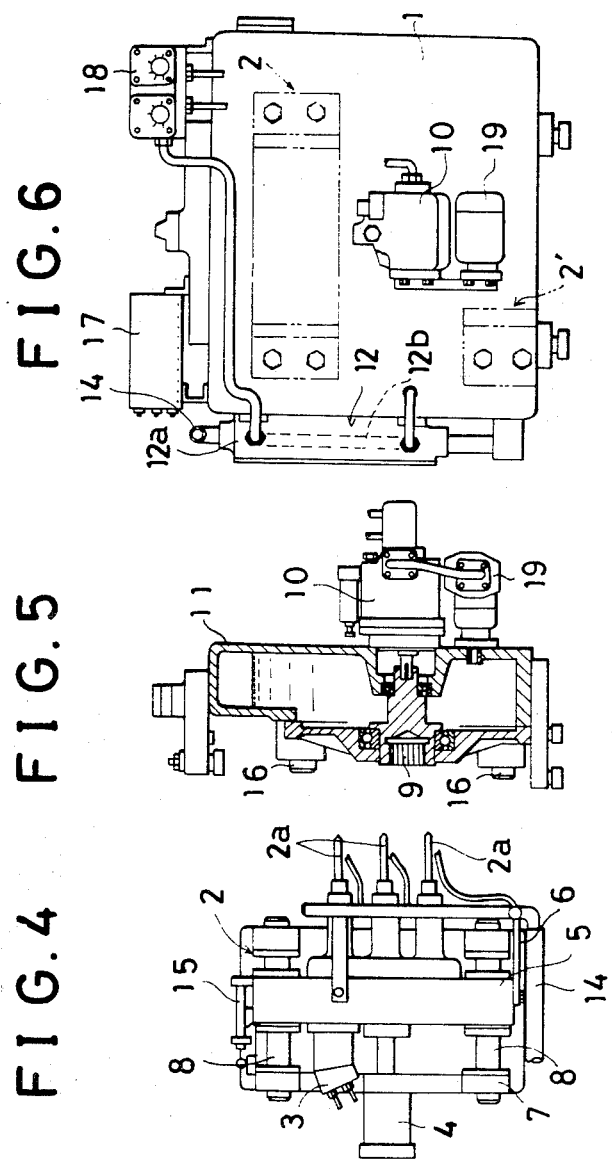

GANG HEAD TYPE MACHINE TOOL

BACKGROUND OF THE INVENTION

1. Field of the Invention

This invention relates to a gang head means for a replaceable gang head type machine tool and more particularly, to a gang head for a machine tool which can be moved at an inclined angle with respect to a workpiece.

2. Description of the Prior Art

In prior art machine tools such as shown in FIG. 1, for example, a machine base A has a driving unit C mounted thereon, which is movable to advance and retract to and from a jig table B located in front thereof. An annular rail means F comprising a pair of upper and lower annular rails, each surrounding the driving unit C includes a rear stationary rail D and a front movable rail E movable to advance and retract together with the driving unit C. A plurality of gang head means are mounted on the annular rails F and any desired one of them may be positioned on the upper and lower movable rails E by turning an index table I, and advancing the driving unit C. The gang head means selected on the movable rails E is advanced together with the movable rails E towards a workpiece W on the jig table B and the workpiece W is worked by the gang head means.

It has been usual with this type machine tool that the gang head means has a mounting base frame a with a coupling b on its rear surface, the coupling b being connected to a driving shaft G on a front surface of the driving unit C. A multiple spindle type working unit d having a gear box c and arranged to be driven by a power inputted from the coupling b is on a front surface of the mounting base frame a such that its movement in the axial direction may extend along the advancing and retracting directional lines of the movable rails E. By an advancing movement of the rails E, drilling or any other working operation may be carried out on a surface of the workpiece W that is at right angles to the advancing and retracting directions of the movable rails E.

Consequently, any desired working on the surface of the workpiece E which is at right angles to the advancing and retracting directional lines of the movable rails E can be carried out by positioning any desired one of various types of gang head means on the movable rails E. However, any working on an inclined surface of the workpiece E that is not at right angles to the advancing and retracting direction of the movable rails E can not be performed.

In theory, a working unit of the above type may be attached to the frame base a so that its axial direction may be inclined to the advancing and retracting direction of the movable rails E, and also the working unit may be arranged to be movable to advance and retract in its axial direction. Thus, after the movable rails E are advanced to a predetermined position, the working unit d is advanced in its axial direction so that the inclined surface of the workpiece W may be worked thereby. However, for achieving this, a problem arises in how to transmit power from the driving unit C to the working unit arranged to be movable to advance and retract in the inclined direction.

The problem is particularly bad in a case where plural working units are attached to the mounting frame base a so that their inclined directions may be different from each other for applying simultaneous workings to plural inclined surfaces of the workpiece W. If power is mechanically transmitted through a gear means to each of the working units, the transmission mechanism becomes complicated and large in size, and mounting thereof on the mounting frame base a becomes difficult.

SUMMARY OF THE INVENTION

It is a primary object of the present invention to provide a gang head for a machine tool which can be inclined with respect to the workpiece.

It is another object of the present invention to provide a hydraulicly operated means for moving a machine tool gang head with respect to a workpiece to thereby eliminate complicated mechanical structure therefor.

The present invention is directed to a gang head for a replaceable gang head type machine tool. The machine tool includes a base, a jig table, a driving member mounted on the base and movable to advance and retract with respect to the jig table, and an annular rail surrounding the driving member. The annular rail has a rear stationary rail and a movable front rail, the movable rail movable to advance and retract with respect to the jig table along the same direction as the driving member. The gang head comprises a base frame mounted on the movable rail, a working unit mounted on the base frame, wherein the working unit is inclined at an angle other than a right angle, with respect to the direction of advance and retraction of the movable rail, an oil pressure pump, and an oil pressure operated cylinder. The oil pressure cylinder is operatively coupled to the working unit for advancing and retracting the working unit with respect to the jig table.

BRIEF DESCRIPTION OF THE DRAWINGS

FIG. 4 is a top plan view of one embodiment of a working unit which is to be mounted on a gang head means of the present invention.

FIG. 5 is a sectional side view of a gang head means of the present invention having no working unit mounted thereon.

FIG. 6 is a front view thereof.

DETAILED DESCRIPTION OF THE PREFERRED EMBODIMENTS

Figure 1:
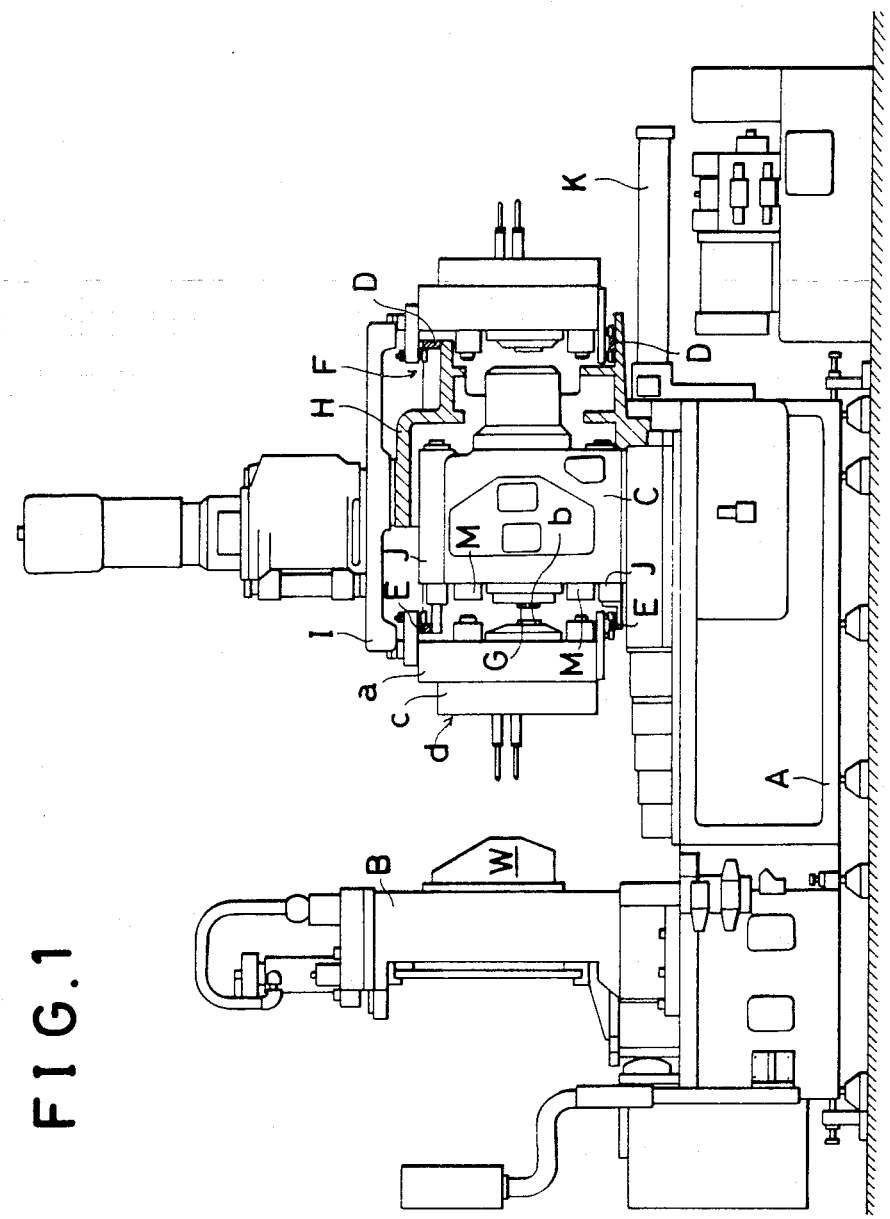
FIG. 1 is a side view, partly in section, of a replaceable gang head type machine tool having a conventional gang head means mounted thereon.
Figure 2:
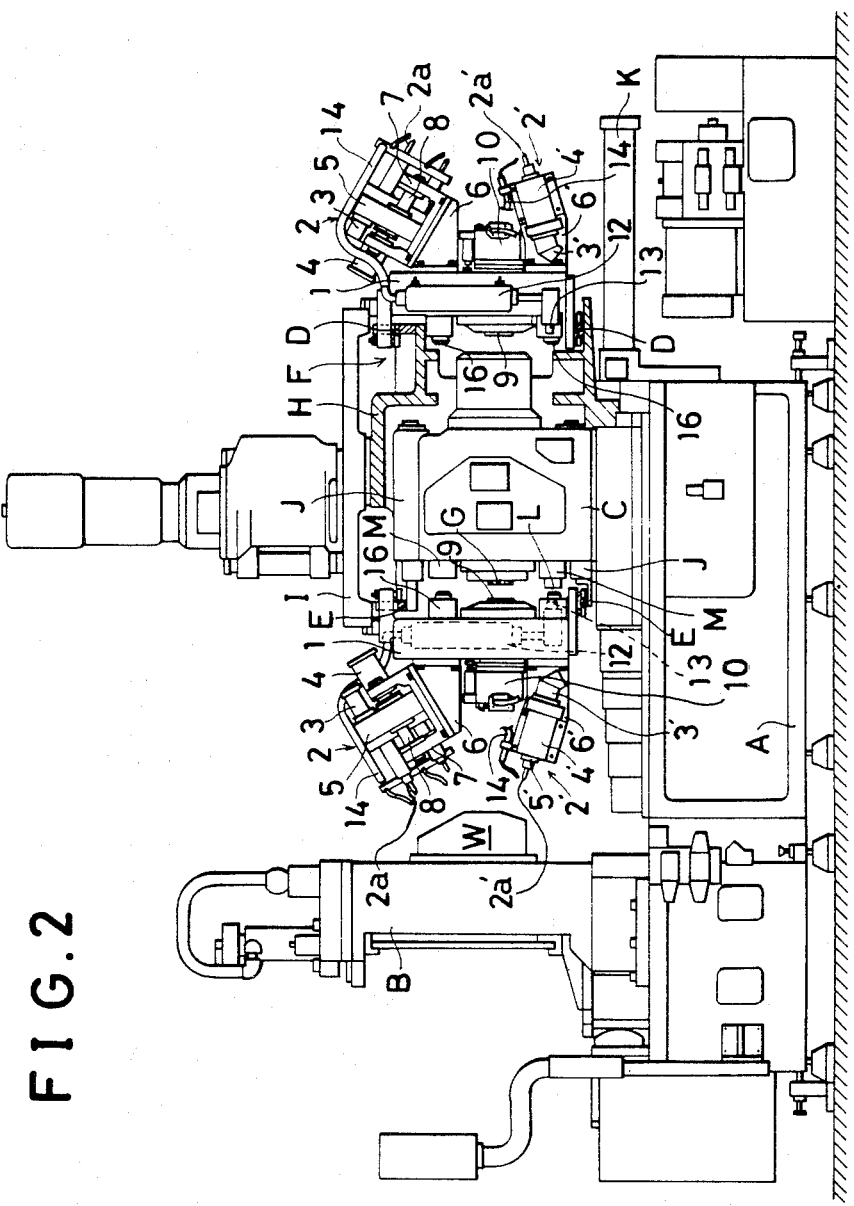
FIG. 2 is a side view, partly in section, of the replaceable gang head type machine tool having a gang head means of the present invention mounted thereon.

FIG. 2 shows a preferred embodiment of the present invention having a gang head means mounted on a replaceable gang head type machine tool which is generally similar to the type of machine tool shown in FIG. 1. In FIG. 2, the index table I is rotatably mounted on a stationary frame H on the machine base A. The index table I is positioned above the upper annular rail F, so that by turning the index table I, any one of a plurality of the gang head means mounted on the upper and lower annular rails F may be positioned on the upper and lower movable rails E. The movable rails E are attached through respective cylinders J to the driving unit C so that when the driving unit C is being advanced by an advancing and retracting cylinder K, the movable rails E are first given a predetermined stroke of relative retracting movement in relation to the driving unit C, and thereafter, is given an advancing movement following the driving unit C.

The gang head means is provided with a mounting base frame 1 which is mounted on the annular rails F in the manner similar to the prior art device of FIG. 1. According to the present invention, however, a working unit 2 is mounted on a front surface of the mounting base frame 1 of the gang head means such that its axis may be inclined with respect to the advancing and retracting direction of the movable rails E and additionally, the working unit 2 is oil pressure operated by an oil pressure motor 3, and is arranged to be movable to be advanced and retracted in its axial direction by the oil pressure cylinder 4.

The mounting base frame 1 is provided on an upper portion of the front surface thereof with a multiple spindle type working unit 2 having plural tools 2a such as drills or the like, and is provided on a lower portion of the front surface thereof with a single spindle type working unit 2' having a single tool 2a. As shown in FIG. 4, the multiple spindle type working unit 2 has a body 5 which also functions as a gear box. The oil pressure motor 3 is attached to the body 5 which is slidably supported by a pair of guide bars 8 extending from a supporting frame 7 attached through a bracket 6 to the mounting base frame 1. The body 5 is movable to be advanced and retracted by the oil pressure cylinder 4 attached to the supporting frame 7. The single spindle type working unit 2' has a main body 5' which is advanced and retracted by an oil pressure cylinder 4' attached to a bracket 6' fixed to the mounting base frame 1. An input shaft of the unit main body 5' extends through the cylinder 4' and is in slidable spline engagement with an output shaft of an oil pressure motor 3' provided behind the cylinder 4' (not shown).

Such an arrangement may be considered that, through not illustrated, the rear surface mounting base frame 1 has an oil supply joint connected through an arrangement of pipes to the respective oil pressure motors 3 and 3' and the respective oil pressure cylinders 4 and 4', and the driving unit C is provided with an oil pressure pump mounted thereon, so that the oil from the oil pressure pump may be supplied through the joint to the respective oil pressure motors 3 and 3' and the respective oil pressure cylinders 4 and 4'.

In the illustrated example, however, as shown clearly in FIGS. 5 and 6, the mounting base frame 1 is provided with an oil pressure pump 10 mounted on a front surface thereof, which is connected through a coupling 9 on a rear surface of the mounting base frame 1 to the driving shaft G on the front surface of the driving unit C. The mounting base frame 1 is formed with an internal hollow space which is used as an oil tank 11, so that the oil can be supplied to the respective oil pressure motors 3 and 3' and the respective oil pressure cylinders 4 and 4' without adding to the driving unit C the oil pressure pump as described above. Additionally, the mounting base frame 1 is provided with an oil cooler 12 in which a cutting liquid which is supplied to the working tools 2a and 2a', is utilized as a coolant as shown in FIG. 6.

In more detail, the mounting base frame 1 is provided on its rear surface with a cutting liquid joint 13 facing a cutting liquid supply opening L on the front surface of the driving unit C, which connects to a cutting liquid tank on the exterior. A jacket 12a forms the outer peripheral portion of the oil cooler 12 which is mounted on the mounting base frame 1. The oil cooler 12 is connected between a cutting liquid supply passage 14 and the joint 13 so that the oil discharged from the oil pressure motors 3 and 3' and the oil pressure cylinders 4 and 4' is returned to the oil tank 11 through a hollow core 12b forming the inner portion of the oil cooler 12, and cooling of the oil in the cooler 12 is carried out by the cutting liquid, serving as a coolant, flowing through the jacket 12a.

In this case, the cutting liquid is supplied to each tool 2a in an incontinent manner, so that it is unnecessary to provide additional cooling apparatus for circulating and cooling a coolant as in prior art liquid-cooling type coolers.

The advance feeding speed and the rotation speed of each of the working units 2 and 2' are controlled by controlling the oil supply to the respective oil pressure cylinders 4 and 4' and the respective oil pressure motors 3 and 3'. These control operations are effected by sequence control using an air limit valve 15 provided on each of the working units 2 and 2'. The air pressure used for this control system is supplied through a positioning pin 16 on a rear surface of the mounting base frame 1 that is aligned with a coupling member M on a front surface of the driving unit C. The coupling member M is usually arranged so that compressed air is supplied thereto for keeping away foreign matter which would otherwise attach thereto and bite therein at the time of contact with the positioning pin 16. The sequence control may be carried out by utilizing this compressed air.

Referring to the drawings, numeral 17 denotes a working unit control box, numeral 18 denotes an oil pressure motor rotation control valve, numeral 19 denotes an oil filter, and numeral 20 and numeral 21 denote gears between the coupling 9 and the oil pressure pump 10.

Next, the operation of the apparatus will be explained as follows:

From the condition as shown in FIG. 2, in which the gang head means is on the movable rails E, the driving unit C is advanced, and in the initial period of the advance movement thereof, there is a predetermined stroke of relative retraction of the movable rails E and thereby the driving shaft G, the cutting liquid supply opening L and the coupling member M on the front surface of the driving unit C are connected to the coupling 9, the cutting liquid coupling 13 and the positioning pin 16, respectively, which are on the rear surface of the mounting base frame 1. Thereafter, by the subsequent continuous advance movement of the driving unit C, the gang head means advances together with the movable rails E.

Figure 3:
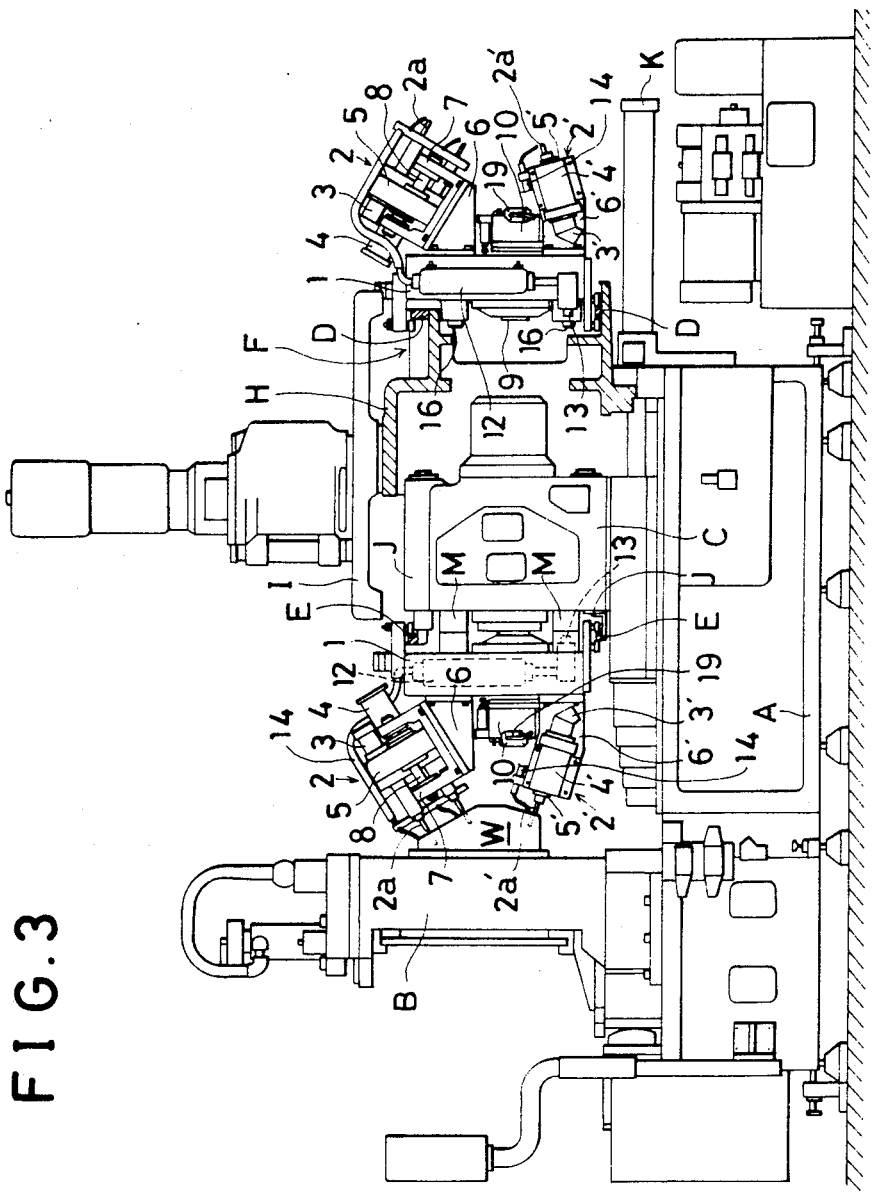
FIG. 3 is a side view thereof, partly in section, in its operating condition.

If the gang head means is advanced to a predetermined advanced position shown in FIG. 3, the oil pump 10 is operated by a power inputted thereto through the coupling 9. The oil pressure motors 3 and 3' and the oil pressure cylinders 4 and 4' of the respective working units 2 and 2' are supplied with oil under pressure, whereby the respective working units 2 and 2' are given their respective rotating operations and their respective advance feeding operations directed to the respective inclined surfaces of the workpieces W on the jig table B and thus, the respective inclined surfaces are worked.

In this situation, each tool 2a and 2a' of the working units 2 and 2' is supplied with the cutting liquid from the cutting liquid coupling 13 through the liquid supply passage 14, and at the same time, the oil in the oil cooler 12 is cooled using the cutting liquid as a coolant.

Figure 8:
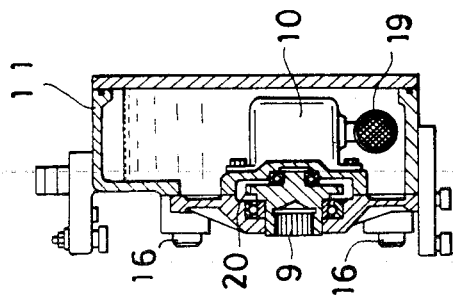
FIG. 8 is a sectional view taken along the line VII—VII in FIG. 7.
Figure 7:
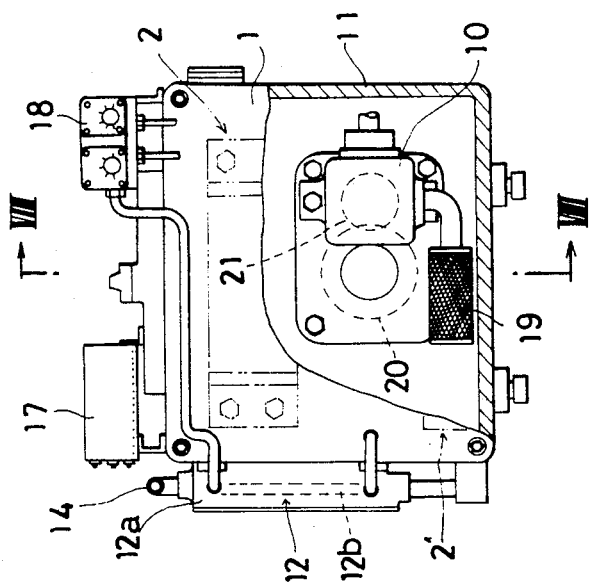
FIG. 7 is a front view, partly in section, of another embodiment of a gang head means of the present invention.

In one embodiment, the oil pressure pump 10 is provided on the front surface of the mounting base frame 1. However, as shown in FIGS. 7 and 8, the pump 10 may be positioned in the oil tank 11 which is the hollow interior of the mounting base frame 1, whereby the center of gravity of the gang head means is moved towards the rear surface side of the mounting base frame 1 and can, therefore, be mounted on the machine tool in a well balanced condition. Further, it is possible to provide an additional working unit on the front surface of the mounting base frame 1.

Thus, according to the present invention, the mounting base frame is provided with a working unit which is movable to advance and retract by means of an oil pressure cylinder and is oblique to the advancing and retracting direction so that it becomes possible to work on an inclined surface of the workpiece that is not at right angles to the advancing and retracting direction of the movable rail. Additionally, the working unit is an oil pressure operated type which differs from a type that has power transmitted mechanically thereto and thus, it becomes unnecessary to provide a complicated transmission mechanism, even when plural working units are provided on the mounting base frame. The apparatus operates with an arrangement of oil pressure pipes for the oil pressure motor and the oil pressure cylinder of each working unit, and thus, the mounting thereof on the mounting base frame can be facilitated.

The present invention may be embodied in other specific forms without departing from the spirit or essential characteristics thereof. The presently disclosed embodiments are, therefore, to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A gang head means for a replaceable gang head type machine tool, said machine tool including a base, a jig table, driving means mounted on said base and movable to advance and retract with respect to said jig table, means for advancing and retracting said driving means, and annular rail means surrounding said driving means and holding plural gang head means, said annular rail means having a rear stationary rail and a movable front rail, said movable rail movable to advance and retract with respect to said jig table along the same direction as said driving means, each said gang head means comprising base frame means mounted on said movable rail, a working unit mounted on said base frame means and having at least one tool thereon, said driving means being provided for driving the gang head means which is on said movable rail, wherein said working unit is inclined at an angle, other than a right angle, with respect to the direction of advance and retraction of said movable rail, an oil pressure motor mounted on said working unit operatively driving said at least one tool independently of said driving means, and an oil pressure operated cylinder, said oil pressure cylinder being operatively coupled to said working unit for advancing and retracting said working unit with respect to said jig table independently of movement of said driving means.

2. A gang head means of claim 1, wherein said base frame means includes an oil tank and an oil pressure pump coupled to a driving shaft on said driving means, wherein the oil in said oil tank is supplied through the oil pressure pump to said oil pressure motor and said oil pressure cylinder.

3. A gang head means of claim 2, further including a liquid oil cooler mounted on said base frame means, for cooling the oil circulated by said oil pressure pump, said oil cooler utilizing a cutting liquid, which is supplied to a working tool on said working unit, as a coolant for the oil.

4. A gang head means of any one of claims 2 or 3, wherein said base frame means is hollow and wherein the internal hollow space thereof is said oil tank.

5. A gang head means of claim 4, wherein said oil pressure pump is positioned within said oil tank.

* * * * *